United States Patent Office 3,527,740
Patented Sept. 8, 1970

3,527,740
VULCANIZATION OF RUBBER WITH COMPLEX OF MONOBORANE AND TERTIARY AMINE OR TRIPHENYL PHOSPHINE AND CALCIUM OXIDE
Crispin Stuart Leworthy Baker, Epping, England, assignor to The Natural Rubber Producers' Research Association, London, England, a British body corporate
No Drawing. Filed May 9, 1968, Ser. No. 728,061
Claims priority, application Great Britain, May 11, 1967, 21,895/67
Int. Cl. C08f *15/40, 27/08*
U.S. Cl. 260—80.78
5 Claims

ABSTRACT OF THE DISCLOSURE

Borane complexes are used as vulcanizing agents for natural rubbers and synthetic rubbers produced by solution polymerisation. The evolution of hydrogen during vulcanization is avoided by the addition of a drying agent, i.e. calcium oxide, to chemically react with moisture present in the vulcanizable mixture.

---

This invention is concerned with the vulcanization of rubber, and relates to culcanizable compositions comprising natural or certain synthetic rubbers, together with vulcanizing agents and other additives.

U.S. Pat. No. 2,558,559 teaches that boron hydrides are advantageous vulcanizing agents for two specific classes of synthetic rubbers, namely, certain co-polymers of butadienes and acrylonitrile, and polymers of 2-chlorobutadiene-1,3, and states that boron hydrides also have some vulcanizing effect on other rubbers, particularly butadiene-styrene rubber and natural rubber. According to the United States patent, the boron hydride may be used in the form of a complex with ammonia or with certain amines, or in the form of other derivatives. When the uncomplexed boron hydride is used, it is preferably added in admixture with an inert filler, for example, calcined clay, to reduce its flammability.

We have found that, although boron hydride complexes are capable of vulcanizing rubbers containing olefinic unsaturation, the process may be handicapped by the evolution of gas during cure, leading to porous vulcanizates.

It is thought that the gas, which has been shown to be mainly hydrogen, is primarily produced by reaction of the borane with small quantities of water present in many of the rubbers;

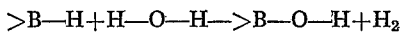

In the case of some rubbers with a particular type of chemical structure, a second reaction leading to the formation of hydrogen may be observed. Modification of the vulcanization processes to overcome this secondary source of hydrogen is the subject of our co-pending application No. 21894/67 filed on the same day as this one.

The present invention provides a vulcanizable composition comprising natural rubber, or an olefinically unsaturated synthetic rubber produced by solution polymerisation, a minor proportion of a borane complex as a vulcanizing agent for the rubber, and a drying agent to chemically react with all the moisture present in the rubber to give a product which is unreactive towards the borane complex.

The vulcanizable composition should preferably not contain any substantial quantity of any non-rubber (other than water) which is reactive towards borane with or without gas evolution. Natural rubber normally contains some acidic material, but the proportion may be found to be so small that no noticeable evolution of gas takes place on vulcanization. The synthetic rubber is one produced by solution polymerisation. Examples of synthetic rubbers which are produced by this method are: 1,4-polybutadiene, for example, the high-cis product sold by Phillips Petroleum International Corporation under the trade name "Cis 4"; polyisoprene, for example, the high-cis product sold by Goodyear Tire and Rubber Company under the trade name "Natsyn"; styrene-butadiene copolymers, for example that sold by Phillips Petroleum International Corporation under the trade name "Solprene"; and ethylene-propylene terpolymers such as that sold by E. I. du Pont de Nemours and Company Incorporated under the trade name "Nordel."

Synthetic rubbers produced by emulsion polymerisation do not normally give attractive vulcanates when borane complexes are used, and gas evolution may be observed. Emulsion polymers normally contain a substantial proportion, for example 5%, of fatty acids and soaps present as surface-active agents, and it is believed that these react with the borane complex to give hydrogen.

The term "borane complex" is intended to include complexes of borane, $BH_3$, and derivatives thereof which possess vulcanizing activity, with any complexing agent which does not itself react with the borane. Complexes of boranes may be readily formed, for example with amines, phosphines or phosphites. Examples of complexes are triethylamine-borane $(C_2H_5)_3N:BH_3$, tertiary-butylamine borane $C_4H_9NH_2:BH_3$, triethylenediamine-bisborane,

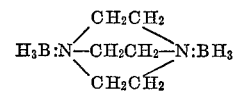

and triphenylphosphine-borane, $(C_6H_5)_3P:BH_3$. Complexes with oxygen- and sulphur-containing compounds may be less stable.

The purpose of the complexing agent is to enable the borane to be handled safely and conveniently at ambient temperatures. The nature of the complex influences the temperature at which vulcanization takes place, so the choice of a suitable complexing agent may be dictated by the desirability of performing vulcanization at temperatures above those likely to be reached when the components undergo the normal mixing processes.

The amount of the borane complex required to effect vulcanization may readily be determined by experiment, depending on the nature of the rubber, the time and temperature of cure and the degree of crosslinking required. Suitable proportions may provide from 0.05% to 0.5% particularly 0.2% to 0.4% by weight of boron on the weight of the rubber to be vulcanized.

The drying agent should be one which reacts chemically with moisture present in the rubber to give a product which is substantially unreactive towards the borane. Conventional drying agents, such as synthetic zeolites, magnesium sulphate and calcium sulphate hemihydrate, are ineffective because they hold the moisture only physically or as water of crystallisation. Phthalic anhydride is also ineffective because although it reacts with water it gives a product, phthalic acid, which itself reacts with the borane. A preferred drying agent is calcium oxide either as such or in the form of a 75% w./w. dispersion in mineral oil as sold by John & E. Sturge Ltd., under the trade name of "Caloxol C31."

Enough of the drying agent should be present to react with all the moisture in the rubber. An improvement is observed when 2 phr. of drying agent is present, and proportions of from 4 to 10 phr. are adequate for use with all normal rubber mixes. It has been found convenient to use 6 parts of Caloxol C31 per 100 parts by weight of rubber.

Conventional fillers, plasticisers, synthetic resins and other desirable compounding ingredients may be included in conventional proportions in the vulcanizable compositions of the invention provided that they are inactive towards the borane.

The invention also provides a method of vulcanizing a natural or synthetic rubber, which method comprises heating the vulcanizable composition hereinbefore defined for a time and at a temperature to effect vulcanization. Heating times of from 10 minutes to 1 hour at temperatures of from 120° C. to 150° C. have been found convenient, but other times and temperatures may be chosen. As no induction period is observed when curing with borane complexes, it is preferred to introduce the vulcanizable composition into a mould which has been preheated to a temperature of not less than 20° C. below the minimum practicable cure temperature.

The following examples illustrate the invention.

25 gram samples of various natural and unsaturated synthetic rubbers were mixed with varying proportions of triethylene-diamine-bisborane, and also in some cases with Caloxol C31 as a drying agent. The mixtures were introduced into a mould heated to 130° C. and subsequently heated to 150° C., the total heating time being 1 hour. The relaxed modulus at 100% extension (MR100) is a standard test, and is normally regarded as giving a useful guide to the extent of vulcanization. Values of MR100 and appearance of the vulcanizates are given in the following table, in which proportions of curing agent (as boron) and drying agent are expressed as parts by weight per 100 parts by weight of rubber.

| Rubber | Curing agent | | Drying agent | | MR 100 (kg./cm.²) | Comments |
|---|---|---|---|---|---|---|
| | Wt. (g.) | B (phr.) | Wt. (g.) | (phr.) | | |
| Example: | | | | | | |
| 1 ___ Natural (RSS1) | 0.485 | 0.3 | None | | | Badly blown. |
| 2 ___ do | 0.485 | 0.3 | 1.5 | 6 | 4.9 | Slightly blown. |
| 3 ___ SBR (Phillips Solprene 1204) | 0.162 | 0.1 | None | | 6.0 | Do. |
| 4 ___ do | 0.162 | 0.1 | 1.5 | 6 | 6.9 | Satisfactory cure. |
| 5 ___ EPT (Dupont Nordel) | 0.324 | 0.2 | None | | | Sample blown. |
| 6 ___ do | 0.324 | 0.2 | 1.5 | 6 | 4.3 | Satisfactory cure. |
| 7 ___ BR (Phillips Cis 4 1203) | 0.162 | 0.1 | None | | 6.0 | Very slightly blown. |
| 8 ___ do | 0.162 | 0.1 | 1.5 | 6 | 6.3 | Satisfactory cure. |
| 9 ___ Neoprene WRT | 0.485 | 0.3 | 1.5 | 6 | 7.5 | Sample blown. |

A comparison of Examples 2, 4, 6 and 8 with Nos. 1, 3, 5 and 7 respectively shows that the evolution of gas has been reduced or eliminated in each case. Synthetic rubbers generally contained less moisture than natural rubber; the effect of the drying agent in the latter was therefore more pronounced, the residual slight blowing seen in Example 2 being caused by hydrogen evolution due to the secondary reaction already mentioned. Neoprene WRT is an emulsion polymer. The product of Example 9, although vulcanized, would have been unacceptable for commercial use.

EXAMPLES 10 AND 11

Samples of natural rubber (ribbed smoked sheets, grade 1) were thoroughly mixed with HAF black (50 parts per 100 parts of rubber) and triethylamine-borane (to provide 0.3 part of boron per 100 parts of rubber) with and without a drying agent (Caloxol C31). The vulcanizable mixtures were introduced into a mould and heated to 140° C. for 1 hour.

| Example Number | Rubber wt. (g.) | HAF black (phr.) | Curing agent | | Drying agent | | MR 100 (kg./cm²) | Comments |
|---|---|---|---|---|---|---|---|---|
| | | | Wt. (g.) | B (phr.) | Wt. (g.) | (phr.) | | |
| 10 | 25 | 50 | 0.80 | 0.3 | None | | 20.8 | Badly blown. |
| 11 | 40 | 50 | 1.28 | 0.3 | 2.4 | 6 | 20.5 | Slightly blown. |

EXAMPLE 12

A 25 gram sample of natural rubber (ribbed smoked sheets, grade 1) was thoroughly mixed with 12.5 grams of HAF black, 1.92 grams of triphenylphosphine-borane (to provide 0.3 part of boron per 100 parts of rubber) and 1.5 grams of Caloxol C31 (to provide 6 parts per 100 parts of rubber). The vulcanizable mixture was introduced into a mould at 110° C. and heated to 150° C. for a total time of 1 hour. The vulcanizate was porous but had a modulus (MR100) of 22.8 kg./cm.² and would have been acceptable for some purposes.

EXAMPLES 13 and 14

Samples of natural rubber (ribbed smoked sheets, grade 1) were thoroughly mixed with HAF black (50 parts per 100 parts of rubber) and tertiary-butylamine-borane (to provide 0.3 part of boron per 100 parts of rubber) with and without a drying agent (Caloxol C31). The vulcanizable mixtures were introduced into a mould and heated to 120° C. for 40 minutes.

| Example Number | Rubber wt. (g.) | HAF black (phr.) | Curing agent | | Drying agent | | Comments |
|---|---|---|---|---|---|---|---|
| | | | Wt. (g.) | B (phr.) | Wt. (g.) | (phr.) | |
| 13 | 10 | 50 | 0.24 | 0.3 | None | | Very badly blown. |
| 14 | 10 | 50 | 0.24 | 0.3 | 0.6 | 6 | Blown. |

The vulcanized rubbers of the invention can be used for the same purposes as prior known vulcanized rubbers, e.g. in the manufacture in per se conventional manner of rubber articles where resistance to creep is not a vital property.

I claim:
1. Vulcanizable rubber composition comprising
   (1) natural rubber or an olefinically unsaturated synthetic rubber prepared by solution polymerization selected from the group consisting of polybutadiene, polyisoprene, styrene-butadiene copolymers and terpolymers from ethylene-propylene-diene monomers,
   (2) a complex of monoborane $BH_3$ with a tertiary amine or triphenyl phosphine, said complex being present in an amount to provide from 0.05% to 0.5% by weight of boron based on the weight of the rubber to be vulcanized, and
   (3) calcium oxide as a drying agent to react chemically with moisture present in the rubber to give a product which is unreactive towards the borane complex.
2. A composition as claimed in claim 1, wherein an amine-borane complex is used.
3. A composition as claimed in claim 2, wherein the amine-borane complex is triethylenediamine-bisborane.
4. A composition as claimed in claim 1, wherein the borane complex provides from 0.2% to 0.4% by weight of boron based on the weight of the rubber to be vulcanized.

5. A method of vulcanizing a natural or synthetic rubber, which method comprises heating the vulcanizable composition claimed in claim 1 for a time and at a temperature to effect vulcanization.

References Cited

UNITED STATES PATENTS 2,558,559  6/1951  Hurd et al. _____ 260—768 XR
2,961,444  11/1960  Aftandilian _____ 260—768 XR
3,154,561  10/1964  Muetterties _____ 260—768 XR
3,225,017  12/1965  Seegman et al. _____ 260—79.1

JOSEPH L. SCHOFER, Primary Examiner

W. F. HAMROCK, Assistant Examiner

U.S. Cl. X.R.

260—80.2, 80.7, 85.1, 94.7, 768, 770; 23—358